United States Patent [19]

Klaue

[11] 4,024,931

[45] May 24, 1977

[54] DISK BRAKE ASSEMBLY FOR VEHICLES

[76] Inventor: Hermann Klaue, Tour d'Ivoire 24 e, 1820 Montreux, Switzerland

[22] Filed: Dec. 18, 1975

[21] Appl. No.: 642,160

Related U.S. Application Data

[63] Continuation-in-part of Ser. Nos. 582,982, June 2, 1975, abandoned, and Ser. No. 578,876, May 19, 1975, which is a continuation-in-part of Ser. No. 415,681, Nov. 14, 1973, abandoned, Ser. No. 470,303, May 15, 1974, Pat. No. 3,952,842, Ser. No. 457,261, April 2, 1974, Pat. No. 3,942,610, Ser. No. 73,566, Sept. 18, 1970, abandoned, and Ser. No. 288,287, Sept. 2, 1972, Pat. No. 3,885,650.

[30] Foreign Application Priority Data

| Jan. 23, 1975 | Germany | 2502628 |
| Jan. 20, 1975 | Germany | 2502090 |
| Jan. 20, 1975 | Germany | 2502083 |
| Aug. 25, 1973 | Germany | 2343004 |
| Nov. 17, 1972 | Switzerland | 16741/72 |
| Dec. 27, 1969 | Germany | 1965170 |
| Dec. 27, 1969 | Germany | 1965171 |
| Dec. 2, 1969 | Germany | 1960286 |

[52] U.S. Cl. .................. 188/18 A; 188/71.4; 188/366

[51] Int. Cl.² ........................... F16D 55/02

[58] Field of Search ........ 188/18 A, 218 X L, 72.4, 188/72.5, 366, 73.6, 71.4, 71.3, 73.3; 192/70

[56] References Cited

UNITED STATES PATENTS

| 2,821,273 | 1/1958 | Sanford et al. | 188/366 X |
| 2,823,770 | 2/1958 | Helvern | 188/366 X |
| 3,425,518 | 2/1969 | Morrow | 188/71.4 |

Primary Examiner—Trygve M. Blix
Assistant Examiner—Douglas C. Butler
Attorney, Agent, or Firm—Stevens, Davis, Miller & Mosher

[57] ABSTRACT

A fully-lined disk brake assembly has two disk brake disks disposed in an annular channel of a brake housing. The brake housing rotates with the wheel and a pair of axial movable annular brake disks fixed against rotation with the wheel are disposed in the channel. A fluid actuated ring cylinder and piston assembly, stepped ring cylinders or similar brake actuation mechanism is disposed in the channel between the brake disks. The brake housing is assembled from two separable annular members which are fastened together by screws or a snap-ring. The wheel side member of the brake housing is adapted to receive the wheel bolt for securing the brake housing to a flange on the hub or axle shaft of the wheel assembly.

8 Claims, 4 Drawing Figures

Fig. 3 (A-B)

DISK BRAKE ASSEMBLY FOR VEHICLES

CROSS REFERENCES TO RELATED APPLICATIONS

This invention relates generally to disk brake assemblies for motor vehicles and more particularly to fully-lined disk brakes of the kind disclosed in my copending applications Ser. No. 578,876 filed May 19, 1975 wherein the instant application is a continuation-in-part of said application, wherein Ser. No. 578,876 is a continuation-in-part application of copending applications Ser. No. 415,681 filed Nov. 14, 1973, now abandoned, Ser. No. 470,303 filed May 15, 1974, now U.S. Pat. No. 3,952,842 and Ser. No. 457,261 filed Apr. 2, 1974, now U.S. Pat. No. 3,942,610 and Ser. No. 73,566 filed Sept. 18, 1970, now abandoned, and Ser. No. 288,287 filed Sept. 2, 1972, now U.S. Pat. No. 3,885,650. This application is also a continuation-in-part of application Ser. No. 582,982 filed June 2, 1975, now abandoned.

The fully-lined disk brakes disclosed in the aforesaid applications have rotating, externally open, multi-piece brake housings. The internal walls of the brake housing have brake surfaces which face each other. A stationary brake carrier surrounds the brake housing supports and suspends lined brake rings in an annular channel. The brake rings are fixed against rotation in a circumferential direction but are freely movable axially. A hydraulic or mechanical actuating mechanism is disposed between the brake rings. The hydraulic mechanism may include a ring cylinder and a piston assembly or a stepped cylinder and means for moving the piston under fluid pressure for actuation of the brake rings. The interface between the piston and wall of the cylinder bore is sealed with elastomeric sealing rings disposed in grooves in the wall of the cylinder bore.

The present invention relates to an improvement of the brake housing of the type disclosed in my earlier applications and its object is to provide such a housing of improved strength without an increase in weight. Another object of the invention is to provide a brake housing of the described type having parts which are easily made by machining while retaining the advantage of a housing in which the parts which wear in use are accessible without dismantling the brake actuating mechanism.

BRIEF DESCRIPTION OF THE DRAWINGS

Other objects will become apparent from the following description with reference to the accompanying drawing wherein

FIGS. 3 and 4 are fragmentary sections of an embodiment of the invention illustrating a novel means of detachably securing the two parts of a brake housing together.

There is already known a construction in which the part of the bipartite brake housing on the wheel side is held by the wheel bolts or wheel nuts and the part of the housing on the axle side is screwed separately to the hub or the axle shaft flange. In this solution the wheel disk takes up a part of the axial braking forces, in which connection, due to manufacturing inaccuracies, as a result of the expansion of this part of the brake housing an additional actuating stroke for the brake may become necessary.

The foregoing objects and others are accomplished in accordance with this invention, generally speaking, by providing a disk brake assembly of the type described above having a two-piece brake housing fastened together by bolts or by a ring clamp or snap-ring wherein that part of the brake housing which is on the wheel side is provided with a flange which is adapted to be secured to a flange on the hub or axle-shaft by the wheel bolts.

With this solution, the screws which hold the two parts of the housing together can be arranged just within the braking surface of the wheel part of the housing whereby a stiff connection of the brake surfaces supporting the brake rings which prevents the bending of the halves of the brake housing is assured. After removal of the wheel, the brake housing together with the brake rings and the hydraulic actuation can be pulled out of the brake spider without the hydraulic actuation being separated from the hydraulic system, and the brake housing can then be opened in order to replace worn parts by loosening the connecting screws or the snap ring. In this connection, the flexible brake hose which is guided in an arc with the front wheels depending upon the steering angle, need be pulled outwardly only a slight distance.

Figure 1:
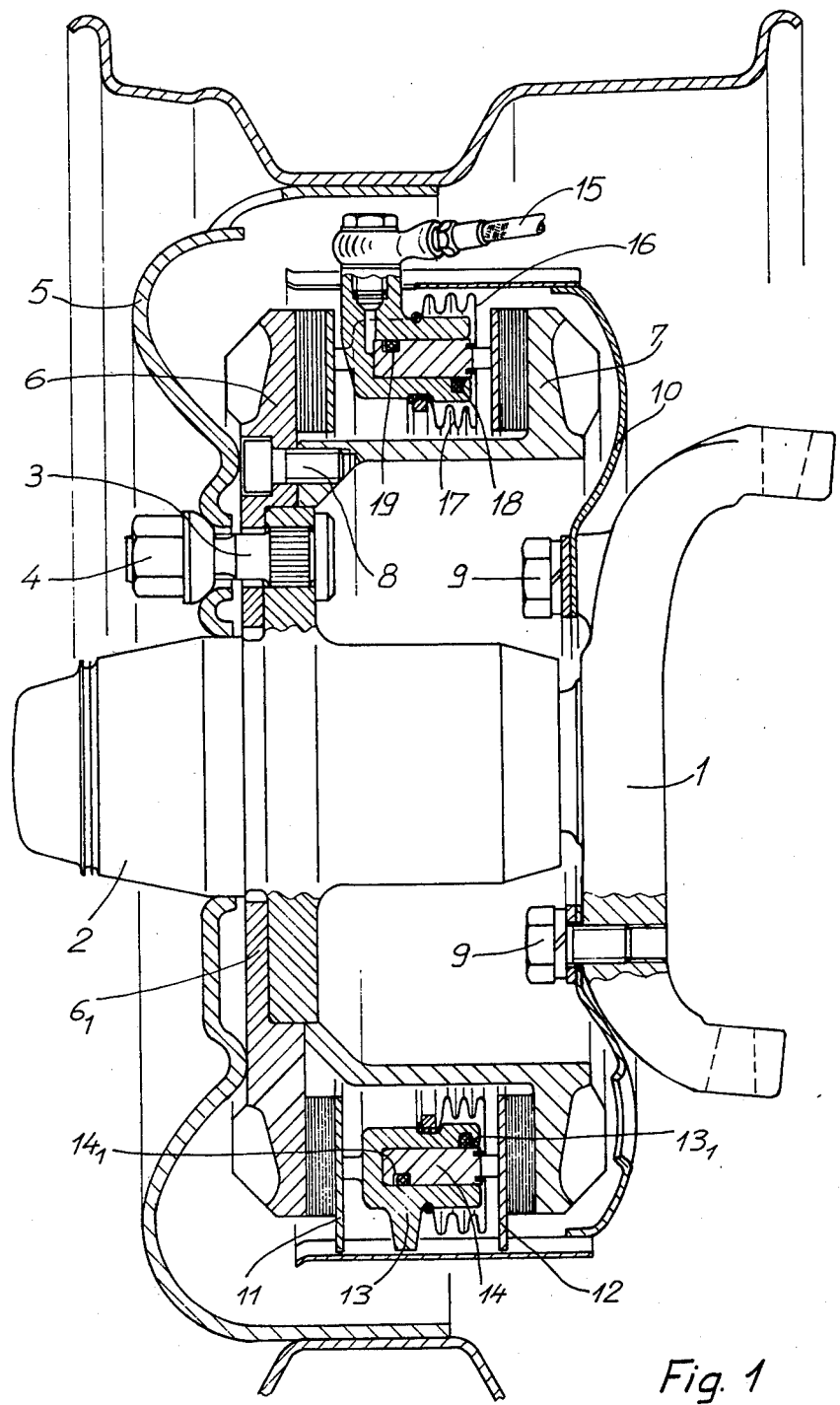
FIG. 1 is a longitudinal section through one embodiment of a front wheel brake for a passenger car.

Referring now to FIG. 1, a steering knuckle 1 bears a hub 2, to which the wheel 5 as well as the bipartite brake housing consisting of cover part 6 and housing part 7 are fastened by means of wheel bolts 3 and nuts 4. Cover and housing parts are connected to each other by circumferentially spaced screws 8 disposed immediately below (as illustrated in the drawing) or, in other words, radially inwardly from the axially extending wall of housing part 7. The brake spider 10 is fastened to the steering knuckle 1 by screws 9, the brake rings 11 and 12 equipped with brake linings being freely movable in the axial direction on the spider but fixed in circumferential direction. Between the brake rings 11 and 12 there is seated a hydraulic actuating unit consisting of ring cylinder 13 and ring piston 14. Oil under pressure is fed via the oil line 15 to the annular space in cylinder 13 at the enclosed end of piston 14. Protective bellows 16 and 17 protect the surfaces of the annular piston 14 and annular cylinder 13 from the penetration of dirt. A sealing ring 18 of square cross section is seated in an annular groove $13_1$ of the ring cylinder 13. The groove $13_1$ has a wall which is beveled in the direction of actuation to permit the ring to deform in the axial direction in order to maintain air clearance. The ring piston 14 on the other hand has a simple groove $14_1$ with walls substantially perpendicular to the longitudinal axis of piston 13. An ordinary sealing ring 19 disposed in groove $14_1$ serves only as a sealing ring and cannot exert any restoring forces on the piston 14.

Figure 2:
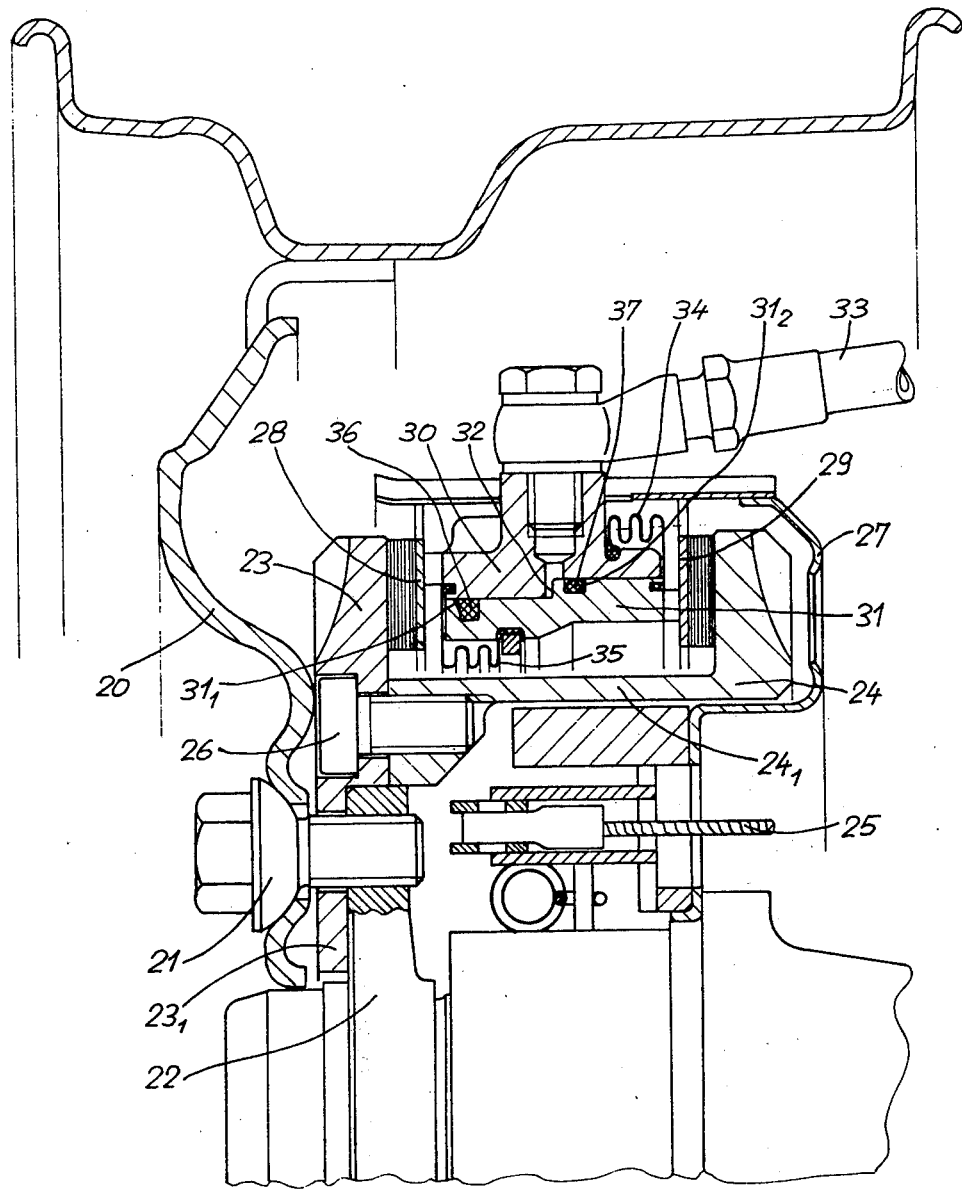
FIG. 2 is a fragmentary longitudinal section of an embodiment of a rear wheel brake for a passenger car.
Figure 4:
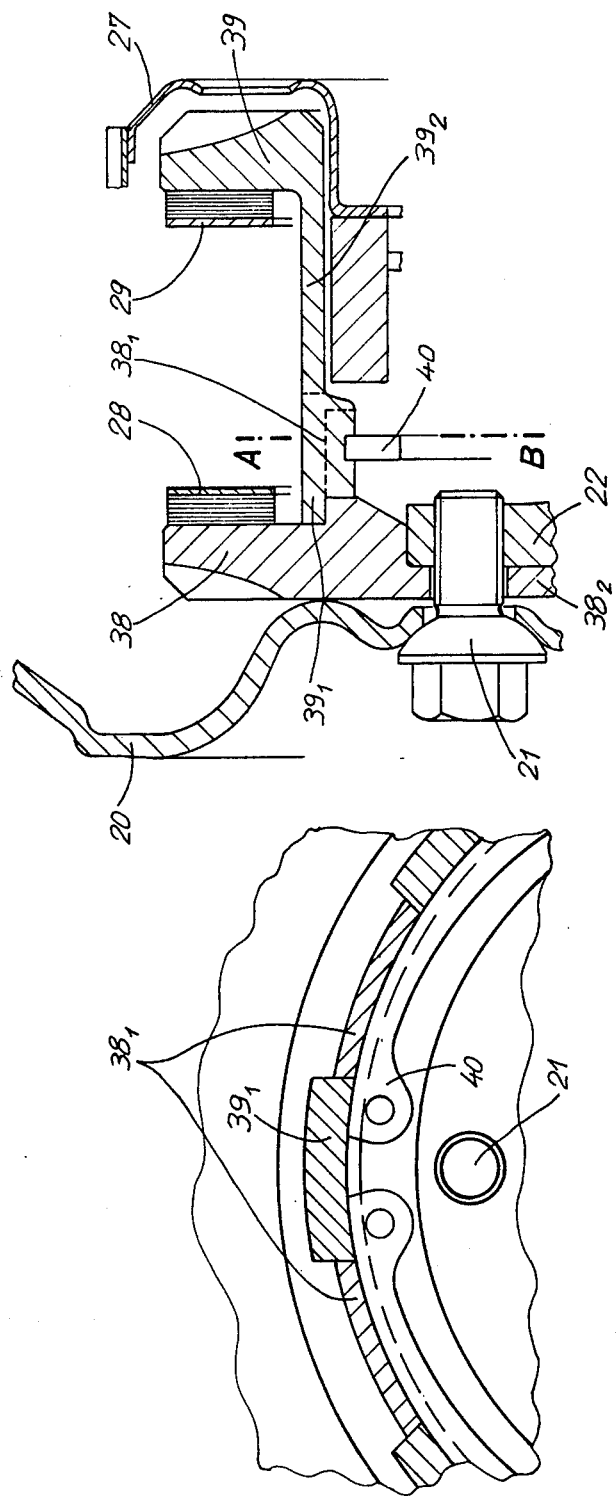

In the case of the rear wheel brake shown in FIG. 2, the wheel 20 is fastened by a ball-collar bolt 21 to the flange 22 of the axial shaft, as is the brake housing which consists of cover part 23 and housing part 24. In the case of this rear wheel brake, the cylindrical part $24_1$ of the housing part 24 serves as a drum for the parking brake which is actuated via the pull member 25. The cover and housing parts of the brake housing are connected with each other by screws 26. The brake rings 28 and 29 provided with brake linings are supported for free axial movement but are fixed in the circumferential direction on the drum shaped outer part of stationary spider 27. The shoes of the parking brake (not shown) are also suspended on spider 27. A stepped-cylinder actuation means having an outer ring 30 and an inner ring 31 with a step space 32 therebetween is seated between brake rings 28 and 29. Oil under pressure is supplied to space 32 via the line 33. Protective bellows 34 and 35 protect the cylindrical sealing surfaces from the penetration of dirt. The sealing of the stepped-cylinder actuation is effected by the sealing-ring of square cross section 36 which is arranged in the groove $31_1$ in the inner stepped cylinder part 31. The wall of groove $31_1$ adjacent to brake ring 28 slopes axially outwardly so the open end of the groove is wider than the closed end. Sealing ring 36 not only forms a fluid tight seal but also tends to urge member 31 back to its original position after braking. Sealing ring 37 located in the groove $31_2$ of the inner stepped cylinder part 31 forms a fluid tight seal between members 30 and 31 on that side of space 32 opposite from sealing ring 36. The two parts 38 and 39 of the brake housing shown in FIGS. 3 and 4 are secured together by a snap-ring 40. Some of the parts of the brake assembly have been omitted for the sake of clarity from the drawing since the embodiment of FIGS. 3 and 4 is similar to the rear wheel brake of FIG. 2 with the exception of snap-ring 40 and cooperating parts. The parts taken over from FIG. 2 are marked with the same reference numbers. In the embodiment of FIGS. 3 and 4, the brake housing part 38 on the wheel side is provided with axial extensions $38_1$ which surround radial projections $39_1$ of the brake housing part 39 on the axle side. The projections $38_1$ and $39_1$ are held together by a snap-ring 40. After removal of the wheel bolts 21 the brake housing together with the brake can be withdrawn from the axle-shaft flange 22 and be opened by removing the snap-ring 40. In this way both the brake rings 28, 29 and the shoes (not shown) of the parking brake for which the cylindrical part $39_2$ of the axle-side brake-housing part 39 serves as brake drum can be replaced.

Although the invention has been described in detail for the purpose of illustration, it is to be understood that such detail is provided solely for that purpose and that variations can be made therein by those skilled in the art without departing from the spirit and scope of the invention.

What is claimed is:
1. A fully lined disk brake and wheel assembly for a vehicle comprising
 a wheel and means for rotatably supporting the wheel on a vehicle comprising a first annular radially extending flange member,
 a brake housing having axially spaced first and second annular wall members, said wall members having inner surfaces which serve as braking surfaces, an annular channel between said inner surfaces which is open on its radially outward side,
 means for attaching the said brake housing to said first annular radially extending flange member comprising a second annular flange member fastened to said wall members which extends radially inwardly from the wall members and overlaps the said first annular radially extending flange member, and means for securing the first and second flange members together,
 axially spaced brake disks disposed in the annular channel with one brake disk facing a first of said braking surfaces and the other brake disk facing the second of said braking surfaces,
 means disposed in the said channel between the brake disks for moving the brake disks axially into contact with the braking surfaces, and
 means for supporting the brake disks in the channel against rotation with the brake housing but free to move axially therein.

2. The disk brake of claim 1 wherein the two members of the housing are bolted together.

3. The disk brake of claim 1 wherein the actuating means comprises a ring cylinder and a ring piston and means for hydraulically actuating the piston.

4. The disk brake of claim 1 wherein the actuating means is a stepped cylinder and means for hydraulically actuating said cylinder.

5. The disk brake of claim 4 wherein said stepped cylinder comprises two rings disposed one against the other, each ring having a shoulder which abuts the shoulder of the other ring, said members being slidable axially with respect to each other, one ring being disposed to move one brake disk and the other to move a second brake disk when the rings are moved axially, and means for applying a fluid under pressure adjacent the shoulders to move the rings relative to each other.

6. In a disk brake assembly for a wheel attachable with wheel bolts to a flange on a means for rotatably supporting a wheel on a vehicle, said brake assembly comprising a housing having two separable annular members having axially spaced facing inner surfaces which provide braking surfaces with an annular channel therebetween, said channel being open at its radially outward side and closed on its radially inward side, the first of said annular members being the wheel side of the housing, disk brakes disposed in the channel and brake disk actuating means being disposed between the brake disks, and stationary means for supporting the brake disks in the channel, the improvement which comprises said wheel side member having a flange which extends radially inwardly from said securing means and adapted to be secured by wheel bolts between a wheel and the said flange on the means for supporting a wheel, and a snap ring securing the said two annular members of the housing together adjacent to said closed inward side.

7. In a disk brake assembly for a wheel attachable with wheel bolts to a flange on a means for rotatably supporting a wheel on a vehicle, said brake assembly comprising a housing having two separable annular members having axially spaced facing inner surfaces which provide braking surfaces with an annular channel therebetween, said channel being open at its radially outward side and closed on its radially inward side, the first of said annular members being the wheel side of the housing, disk brakes disposed in the channel and brake disk actuating means being disposed between the brake disks, and stationary means for supporting the brake disks in the channel, wherein the said separable members are (1) a wheel side member which is disk-shaped and has a central opening to be disposed about a wheel hub, said disk-shaped member being thicker around its peripheral edge than around its radially inner edge whereby the peripheral portion forms the wheel side of the brake housing and the radially inner portion is a flange with the radial dimension of the peripheral portion being larger than the radial depth of the channel, and (2) a second member spaced axially from the first member and having a first portion which is face to face with the thicker portion of the wheel side member to provide a housing wall for the second of said braking surfaces and a second portion integral with the first portion which extends perpendicularly to the first portion across said channel to form a closed radially inward wall of the housing, said second portion having a free end abutting the said thicker portion of the wheel side member at a point spaced radially outward from the said flange portion of the wheel side member, said second portion having a radially inwardly extending flange adjacent its free end which also abuts said thicker portion of the wheel side member, circumferentially spaced screws securing the overlying wheel side members and flange on said second portion together, and an opening in the flange of the wheel side portion adapted to receive a wheel bolt for securing the brake housing to a flange on a hub of a vehicle wheel assembly.

8. In a disk brake assembly for a wheel attachable with wheel bolts to a flange on a means for rotatably supporting a wheel on a vehicle, said brake assembly comprising a housing having two separable annular members having axially spaced facing inner surfaces which provide braking surfaces with an annular channel therebetween, said channel being open at its radially outward side and closed on its radially inward side, the first of said annular members being the wheel side of the housing, disk brakes disposed in the channel and brake disk actuating means being disposed between the brake disks, and stationary means for supporting the brake disks in the channel, wherein the said separable members are (1) a wheel side member which is disk-shaped and has a central opening to be disposed about a wheel hub, said disk-shaped member being thicker around its peripheral edge than around its radially inner edge whereby the peripheral portion forms the wheel side of the brake housing and the radially inner portion is a flange with the radial dimension of the peripheral portion being larger than the radial depth of the channel, and (2) a second member spaced axially from the first member and having a first portion which is face to face with the thicker portion of the wheel side member to provide a housing wall for the second of said braking surfaces and a second portion integral with the first portion which extends perpendicularly to the first portion across said channel to form a closed radially inward wall of the housing, said second portion having a free end abutting the said thicker portion of the wheel side member at a point spaced radially outward from the said flange portion of the wheel side member, said second portion having circumferentially spaced radially inwardly extending integral projection members, a groove in the radially inward surface of the projection members, a clamping ring disposed in said grooves in the projection members, and said wheel side member having axial projection members disposed between the projection members on said second portion, and an opening in the flange of the wheel side portion adapted to receive a wheel bolt for securing the brake housing to a flange on a hub of a vehicle wheel assembly.

* * * * *